(12) United States Patent
Lan et al.

(10) Patent No.: US 6,938,676 B2
(45) Date of Patent: Sep. 6, 2005

(54) COOLING STRUCTURE FOR A CONTINUOUS VARIATION TRANSMISSION SYSTEM OF AN ALL-TERRAIN VEHICLE

(75) Inventors: Tzu-Jung Lan, Kaoshiung (TW); Chao Chang Ho, Feng Shan (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 10/737,908

(22) Filed: Dec. 18, 2003

(65) Prior Publication Data

US 2005/0133194 A1    Jun. 23, 2005

(51) Int. Cl.[7] ............................................. F16H 57/04
(52) U.S. Cl. ......................... 165/41; 180/68.2; 474/93
(58) Field of Search ........................... 165/41; 474/93; 180/68.2

(56) References Cited

U.S. PATENT DOCUMENTS

| | | | | |
|---|---|---|---|---|
| 4,697,665 A | * | 10/1987 | Eastman et al. | 180/230 |
| 5,708,238 A | * | 1/1998 | Asao et al. | 181/272 |
| 5,976,044 A | * | 11/1999 | Kuyama | 474/93 |
| 6,182,784 B1 | * | 2/2001 | Pestotnik | 180/376 |
| 6,454,040 B1 | * | 9/2002 | Fukuda | 180/374 |
| 6,622,806 B1 | * | 9/2003 | Matsuura | 180/68.1 |
| 6,820,708 B2 | * | 11/2004 | Nakamura | 180/68.2 |
| 6,823,956 B2 | * | 11/2004 | Shimizu | 180/68.1 |

* cited by examiner

Primary Examiner—Allen J. Flanigan
(74) Attorney, Agent, or Firm—Leong C. Lei

(57) ABSTRACT

The present invention concerns a cooling structure for a continuous variation transmission system of an all-terrain vehicle. Primarily speaking, it has an inlet conduit attached to the air inlet of the gearbox, with said inlet conduit extending in front of the engine until it reaches the below of the front mud guard, and an inlet box attached to the inlet conduit. An exhaust conduit is also being attached to the exhaust of the gearbox, with said exhaust pipe extending to the rear of the engine until it reaches the below of the rear mud guard, and an exhaust box is attached to the exhaust conduit. Both the inlet box and the exhaust box are placed above the tail of the engine exhaust conduit, and situated on the outer surface of the chassis. The inlet and exhaust box design prevents dust, dirt and water from entering the gearbox. Furthermore, the conduits are installed on the outer surface of the chassis to enable ease of assembly and maintenance, and to reduce the difficulty of installing other components.

2 Claims, 7 Drawing Sheets

COOLING STRUCTURE FOR A CONTINUOUS VARIATION TRANSMISSION SYSTEM OF AN ALL-TERRAIN VEHICLE

BACKGROUND OF THE INVENTION

1. Field of the Invention

The present invention concerns the cooling structure for a continuous variation transmission system of an all-terrain vehicle. It focuses mainly on the installation of an inlet and exhaust conduit each attached to the air inlet and air exhaust of the gearbox. Furthermore, an inlet box and an exhaust box are each attached to the conduits to prevent dust, dirt, and water from entering the gearbox. Additionally, the conduits are installed on the outer surface of the chassis for ease of assembly and maintenance, and also reduce the difficulty of installing other components.

2. Description of the Prior Art

Referring to FIG. 1, in general, all-terrain vehicles 1 are mainly composed of a chassis 11, a steering mechanism 12, front wheels 13, a riding seat 14, rear wheels 15, an engine 16 and the continuous variation transmission system 2. A steering mechanism 12 is installed in front of the chassis 11, with a set of front wheels 13 beneath the steering mechanism 12. There is a riding seat 14 on top of the chassis 11, and below the riding seat 14 is the engine 16. The engine 16 drives the continuous variation transmission system 2 by means of the crankshaft, and a set of rear wheels 15 is attached to the continuous variation transmission system 2.

When the all-terrain vehicle 1 is activated, fresh air is introduced from outside and mixed with fuel to form a fuel/air mixture. The oil vapor is then delivered into the engine 16 to initiate power to advance the piston into high-speed reciprocating motion. An interactive crankshaft drives the pulley mechanism and initiates turning of the rear wheels 15, which will lead in the concurrent turning of the front wheels 13 and achieve the purpose of movement.

Referring to FIG. 2, the continuous variation transmission system 2 in the all-terrain vehicle 1 consists of a pulley mechanism 21 placed inside a gearbox 22. Said pulley mechanism 21 is composed of a sliding disc 211 placed above said crankshaft 161; a driving plate 212 placed above said crankshaft 161 and to one side of said sliding disc 211; a bracket 213 placed above said crankshaft 161; and to the other side of said sliding disc 211, a counter weight 214 placed amid said sliding disc 211 and said bracket 213 due to the limitation of space; a follower shaft 215 which transmits the power to the rear wheels; a follower disc 216 placed on top of said follower shaft 215; a clutch 217 fixed on top of said follower shaft 215; and a transmission belt 218. Wherein, said sliding disc 211 and said driving plate 212 constitutes an initiating member of the pulley mechanism 21. One end of said transmission belt 218 is placed in between said driving disc 212 and said sliding disc 211, and the other end is placed amid said follower disc 216. Said gearbox 22 has an air inlet 221 and an air exhaust 222 with an inlet conduit 223 attached to said air inlet 221 and an exhaust conduit 224 attached to said air exhaust 222.

Inside the combustion chamber of the vehicle engine 16, the power initiated from combustion explosion will advance the piston into a high-speed reciprocating motion, and consquently initiate the spinning of the crankshaft 161. Said sliding disc 211 and said driving disc 212 will spin concurrently and in consequence speed up the spinning of the follower disc 216. Via said clutch 217, said follower shaft 215 will be driven to speed up the spinning and increase the advancing speed of the vehicle. By this time, the high heat produced from spinning of pulley mechanism 21 has to be cooled down by introducing outside cool air from the air inlet conduit 223, and passing through the air inlet 221 to enter the gearbox 22. The hot air will then pass through the exhaust conduit 224 from the air exhaust 222 and exhaust to the outside, to prevent the pulley mechanism 21 from being damaged by overheating.

Referring to FIG. 3, the configuration of the prior art cooling structure for a continuous variation transmission system 2 of the all-terrain vehicle 1 has the inlet conduit 223 and the exhaust conduit 224 of the gearbox 22 placed above the chassis 11 of the all-terrain vehicle 1. Therefore, when an exterior appearance or accessory design change is to be made, it will be affected adversely by the installation of the inlet conduit 223 and the exhaust conduit 224. This installation will bring about limitations for any of the intended above-mentioned design changes on the vehicle and also add to the difficulty of any design alteration. Moreover, there is no extra space beneath the vehicle for other components, such as a compartment or auxiliary component (for example, a battery, a fuel tank or an air filter). If other components are to be installed, the inlet conduit 223 and the exhaust conduit 224 will have to be extended downwards. However, there is a limit to the total height of an all-terrain vehicle 1. Furthermore, when the all-terrain vehicle 1 is moving along the seaside or in the countryside, the inlet conduit 223 and the exhaust conduit 224 have to be installed at a suitable height to prevent dust, dirt, and water from entering the gearbox 22. Therefore, by extending the inlet conduit 223 and the exhaust conduit 224 downwards to install other components, the pulley mechanism will be damaged easily. Also, due to the fact that the inlet conduit 223 and exhaust conduit 224 of the gearbox 22 in the prior art all-terrain vehicle 1 are placed directly above the chassis 11 of the all-terrain vehicle 1, when the mechanical parts are to be maintained, the parts have to be taken apart one by one from the upper riding seat 14 or the body cover. This will cause great inconvenience in assembly and maintenance and also increase difficulty in installing other components.

Acknowledging the aforementioned, the prior art all-terrain vehicle has the cooling structure for a continuous variation transmission system placed beneath the chassis. This adds to the limitations and difficulty of changing the vehicle's design, causes great inconvenience in assembly and maintenance and also increases difficulty in installing other components. Consequently, it is essential to refine the design.

SUMMARY OF THE INVENTION

It is the major object of the present invention to provide an improved cooling structure for a continuous variation transmission system of an all-terrain vehicle. Primarily, the present invention has an inlet conduit attached to the air inlet of the gearbox, and an inlet box attached to the inlet conduit; an exhaust conduit is also attached to the air exhaust of the gearbox, with an exhaust box attached to the exhaust conduit. This is to prevent dust, dirt, and water from entering the gearbox. Furthermore, the inlet and exhaust conduit are installed on the outer surface of the chassis, revealing itself outside the body cover. The present invention enables ease of assembly and maintenance, and also reduces the difficulty in installing other components.

DETAILED DESCRIPTION OF THE PREFERED EMBODIMENT

Figure 1:
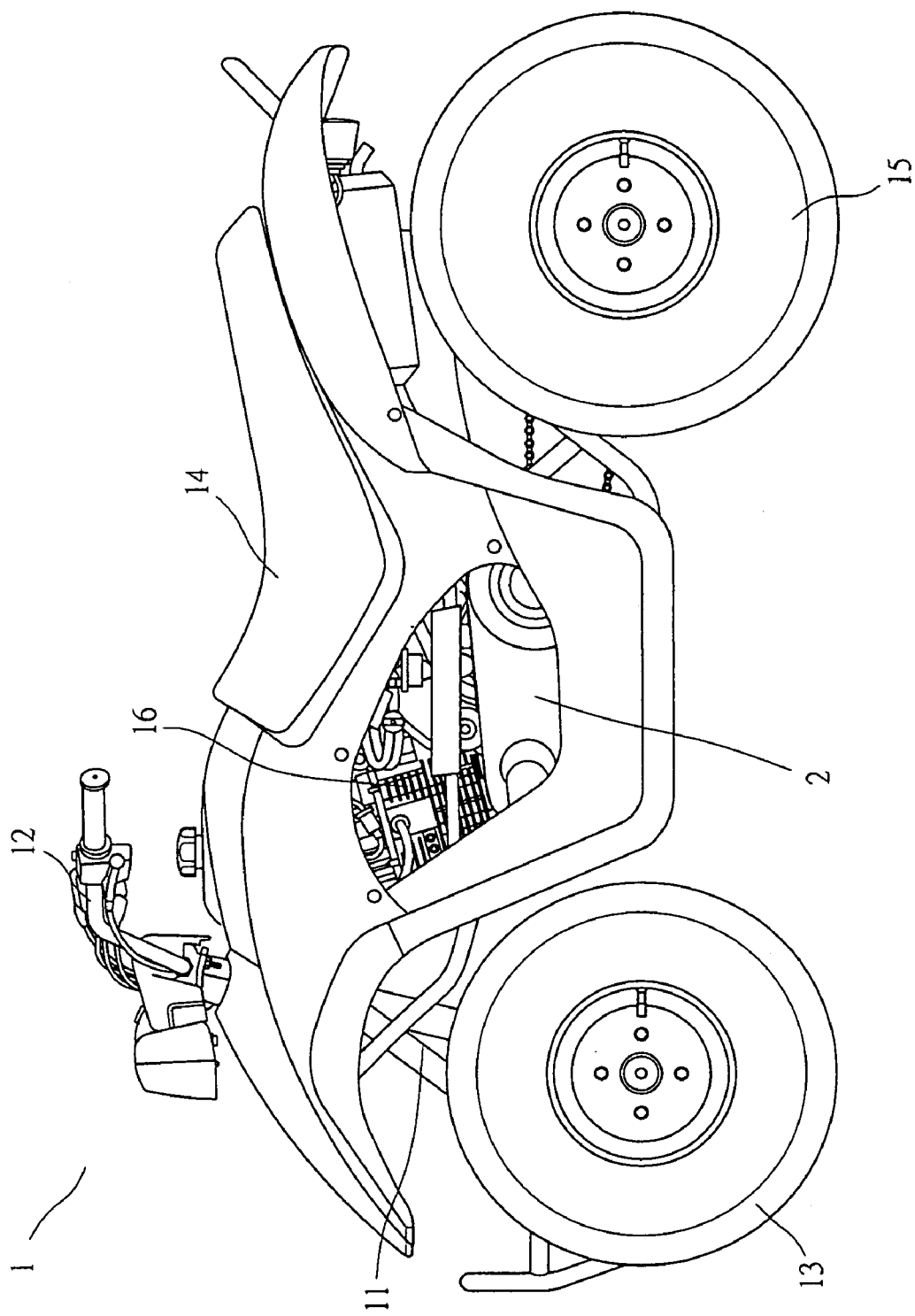
FIG. 1 is a perspective view of a prior art all-terrain vehicle.
Figure 2:
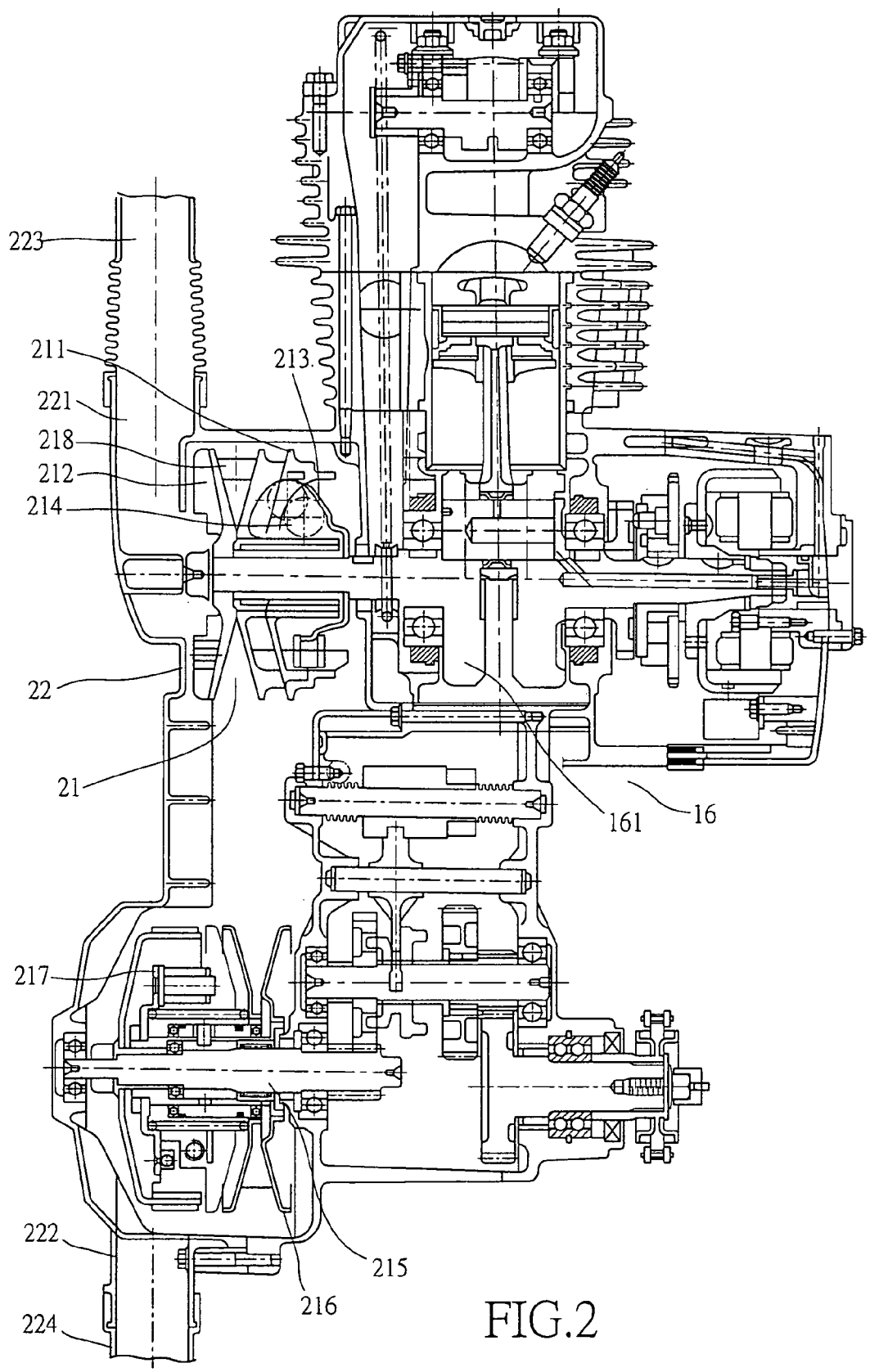
FIG. 2 is a perspective view of a prior art variation transmission system.
Figure 3:
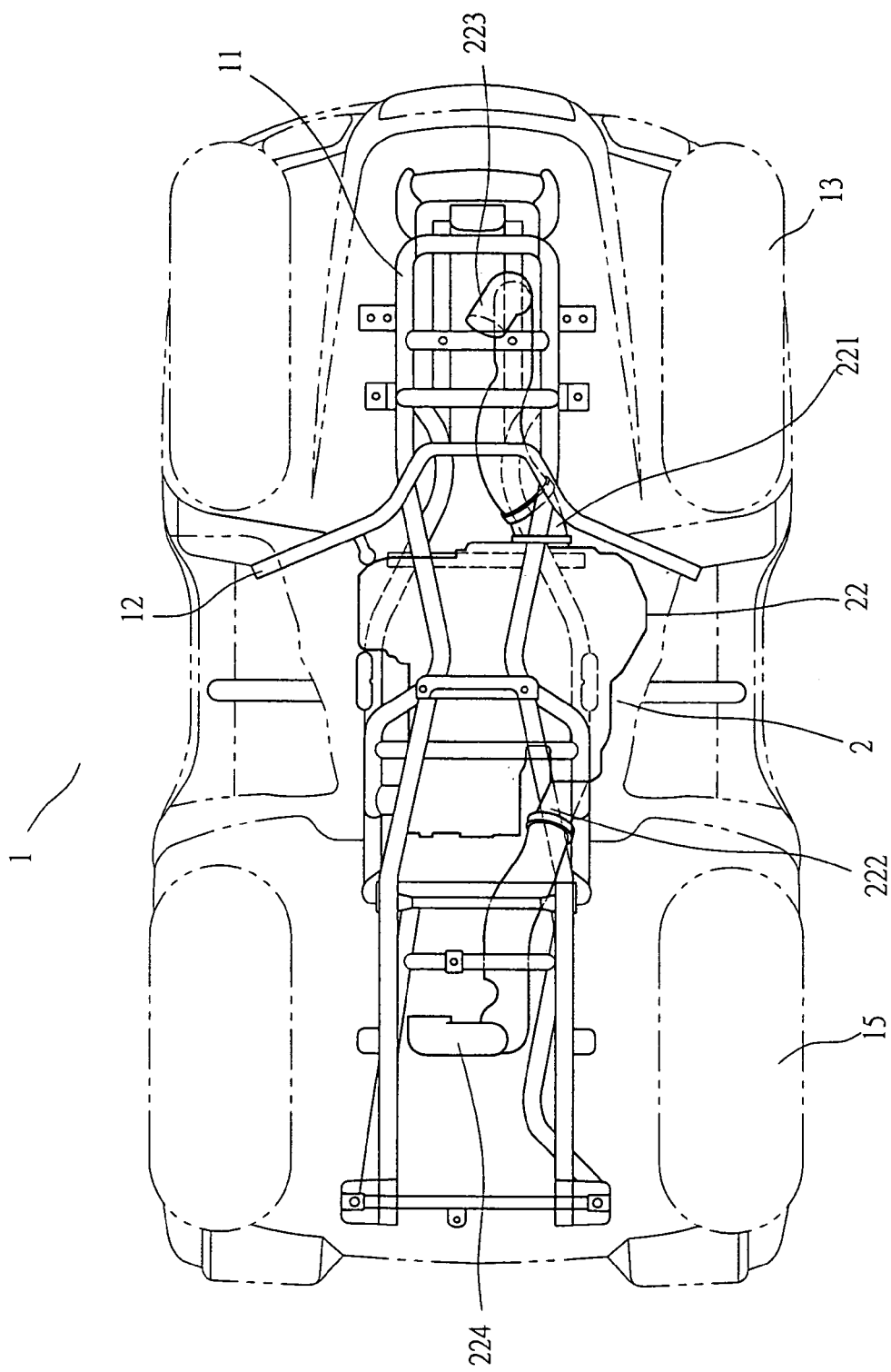
FIG. 3 is a bottom view of a prior art all-terrain vehicle variation transmission system configuration.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 4:
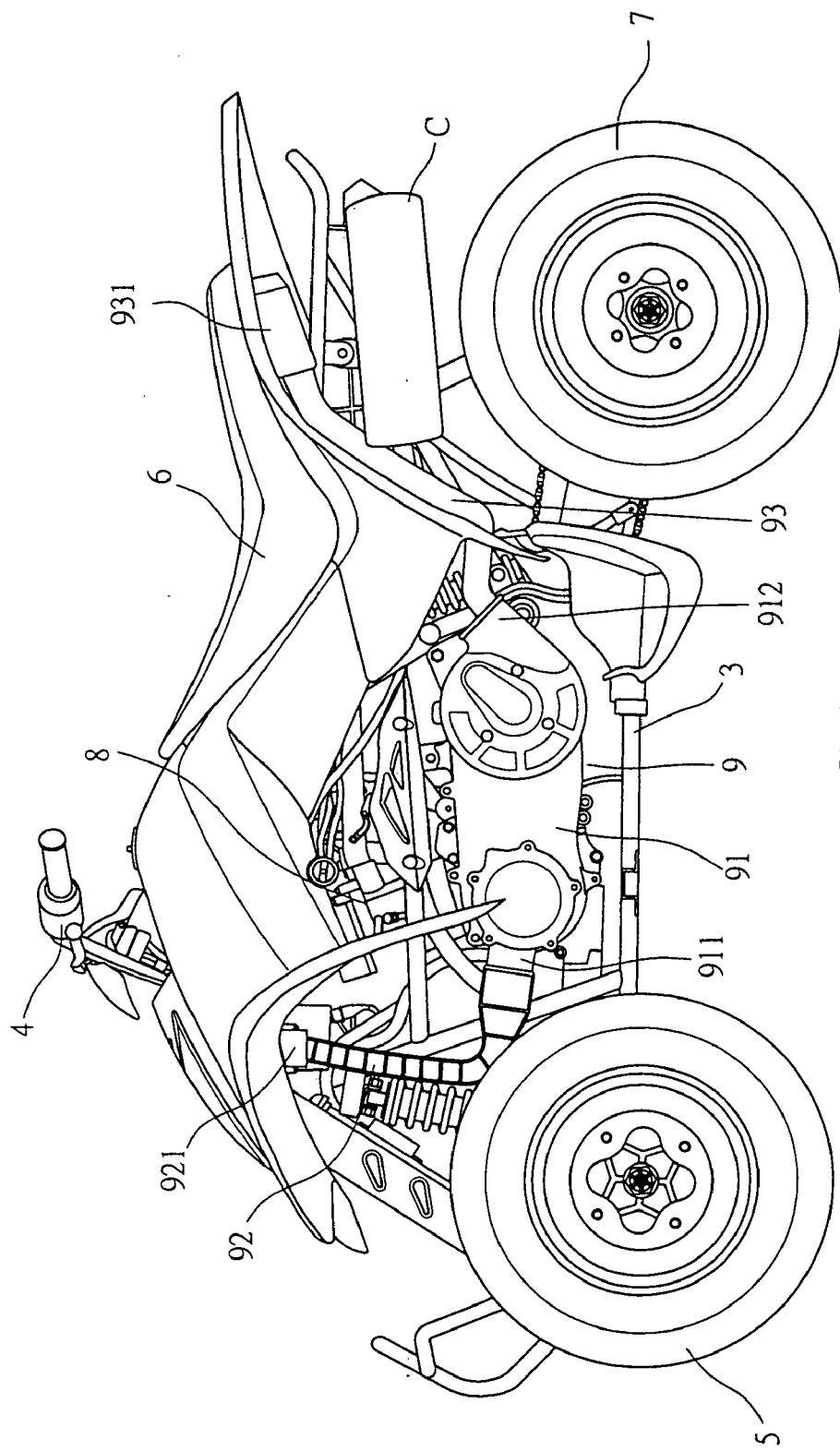
FIG. 4 is a side view of the present invention all-terrain vehicle.

Referring to FIG. 4, similar to the prior art all-terrain vehicles, the present invention is composed of a chassis 3, a steering mechanism 4, front wheels 5, a riding seat 6, rear wheels 7, an engine 8, and the continuous variation transmission system 9. A body cover 31 is installed on said chassis 3, and on the outer surface of said body cover 31 there are the extended installations, a front and rear mudguards A and B respectively. On the front of said body cover 31, a steering mechanism 4 is installed; beneath said steering mechanism 4 is a set of front wheels 5. A riding seat 6 is installed above the chassis 3, and beneath the riding seat 6 is an engine 8. Said engine 8 drives the continuous variation transmission system 9 by a crankshaft, and a set of rear wheels 7 is attached to said continuous variation transmission system 9.

Figure 5:
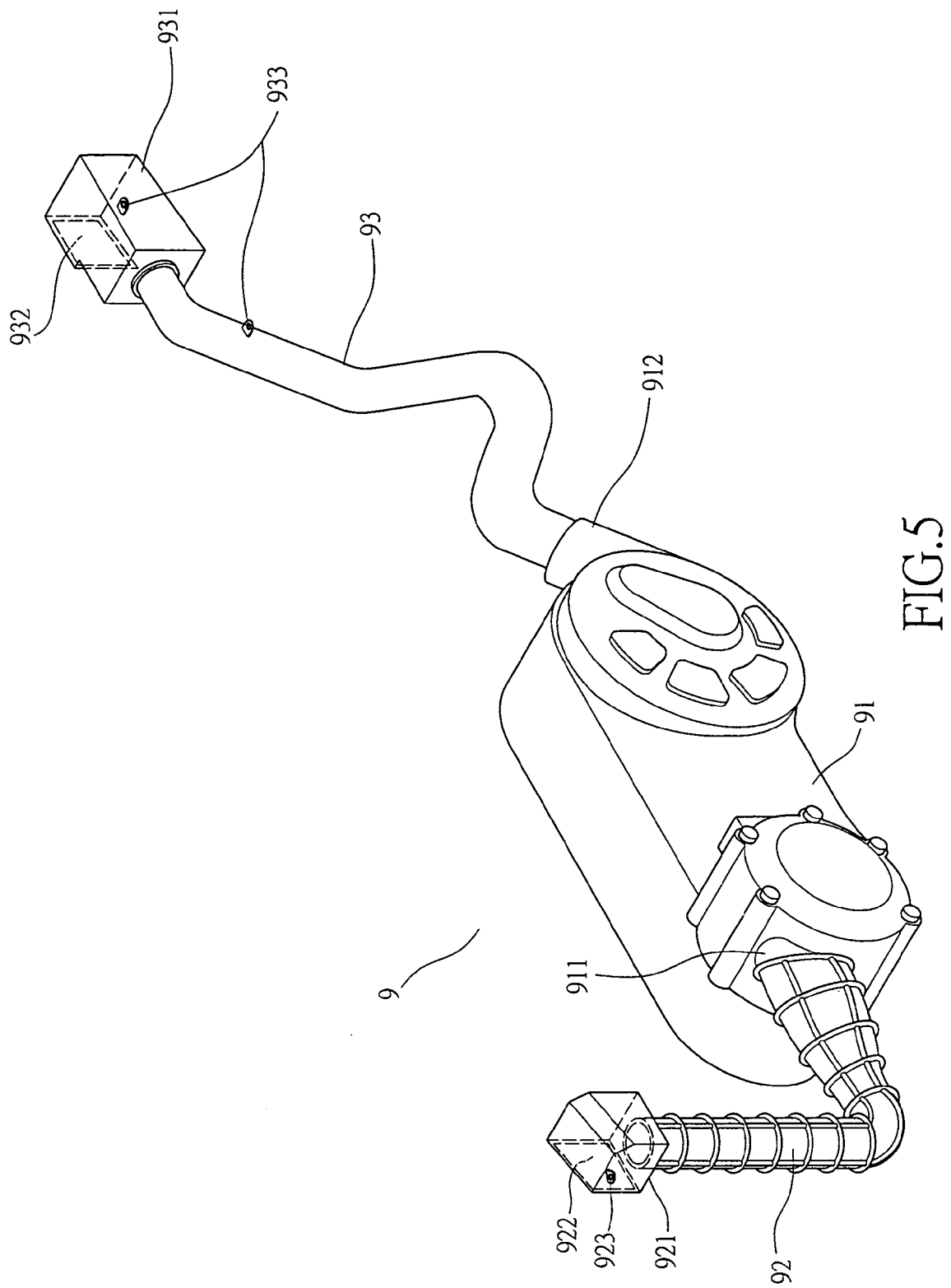
FIG. 5 is an exterior view of the cooling structure of the variation transmission system of the present invention.

Referring to FIG. 5, the present invention cooling structure for a continuous variation transmission system 9 is mainly composed of a gearbox 91, an inlet conduit 92, and an exhaust conduit 93. Said gearbox 91 has an air inlet 911 and an air exhaust 912 installed, and since the pulley mechanism inside the gearbox 91 is the same as the prior art, unnecessary details will not be given here. Said inlet conduit 92 is a hollow elbow duct, with one end attached to an inlet 911 of the gearbox 91, and the other end attached to an inlet box 921. Said inlet box 921 is a box with a port 922, and said port 922 faces the center of the body. Furthermore, the inlet box 921 has a fixing installation 923 on the two sides of the port 922. Said exhaust conduit 93 is also a hollow elbow pipe, with one end attached to an exhaust 912 of the gearbox 91, and the other end attached to an exhaust box 931. Said exhaust box 931 is a box with a port 932, and said port 932 faces the center of the body. Furthermore, the exhaust box 931 has a fixing installation 933 on the two sides of the port 932.

Figure 6:
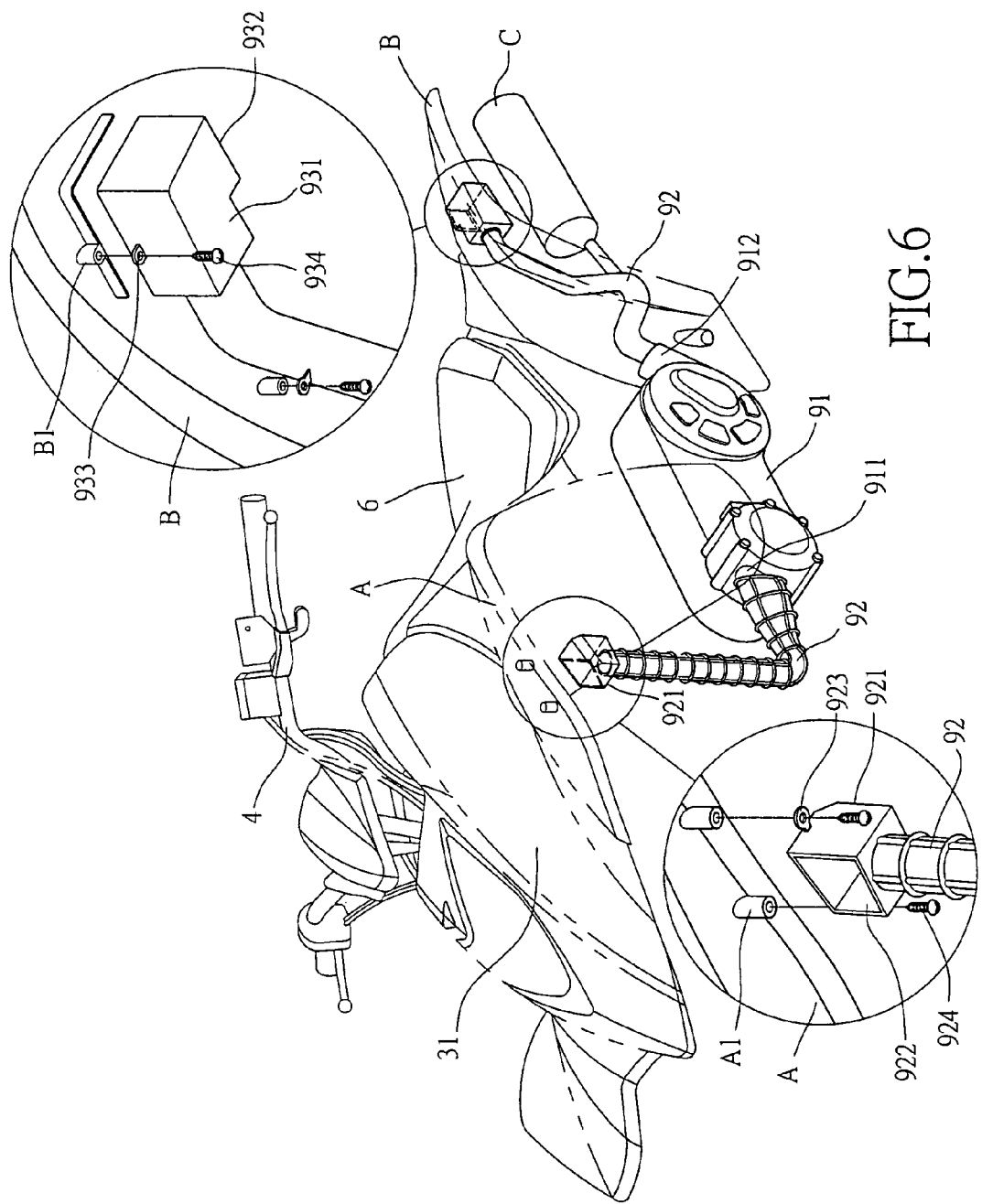
FIG. 6 is an exploded view of the cooling structure of the variation transmission system of the present invention, combined with mudguards.

With reference to FIG. 6, the present invention cooling structure for a continuous variation transmission system 9 is installed on one side of the body when being assembled, revealing itself outside the body cover 31. Said inlet conduit 92 is extended in front of the engine until it reaches the below of the front mudguard A. A fixing screw element 924 secures the inlet box 921 fixing installation 923 to a protruding post A1 below the front mudguard A. Again, said exhaust conduit 93 is extended to the rear of the engine until it reaches below the rear mudguard B. Likewise, a fixing screw element 934 secures the fixing installation 933 of the exhaust box 931 to a protruding post B1 below the rear mudguard B. In addition, both the inlet box 921 and the exhaust box 931 are placed above the tail of the exhaust pipe C, and situated on the outer surface of chassis 3.

Since both the inlet box 921 and the exhaust box 931 are placed above the tail of the exhaust pipe C, when the vehicle moves along the seaside or wet ground, it prevents water from entering the variation transmission system 9 through the inlet and exhaust conduits 92 and 93 respectively and cause damage to the pulley mechanism. With the design of the ports 922 and 932 of the inlet and exhaust boxes 921 and 931, and the installation of the inlet and exhaust boxes 921 and 931 below the front and rear mudguards A and B, dust and dirt are being prevented from entering the gearbox. Furthermore, having the inlet and exhaust conduits 921 and 931 installed on the outer surface of the chassis 3 and revealing itself outside the body cover 31, it reduces the difficulty of the installation of other components, and increases the variety in the outer appearance designs.

Figure 7:
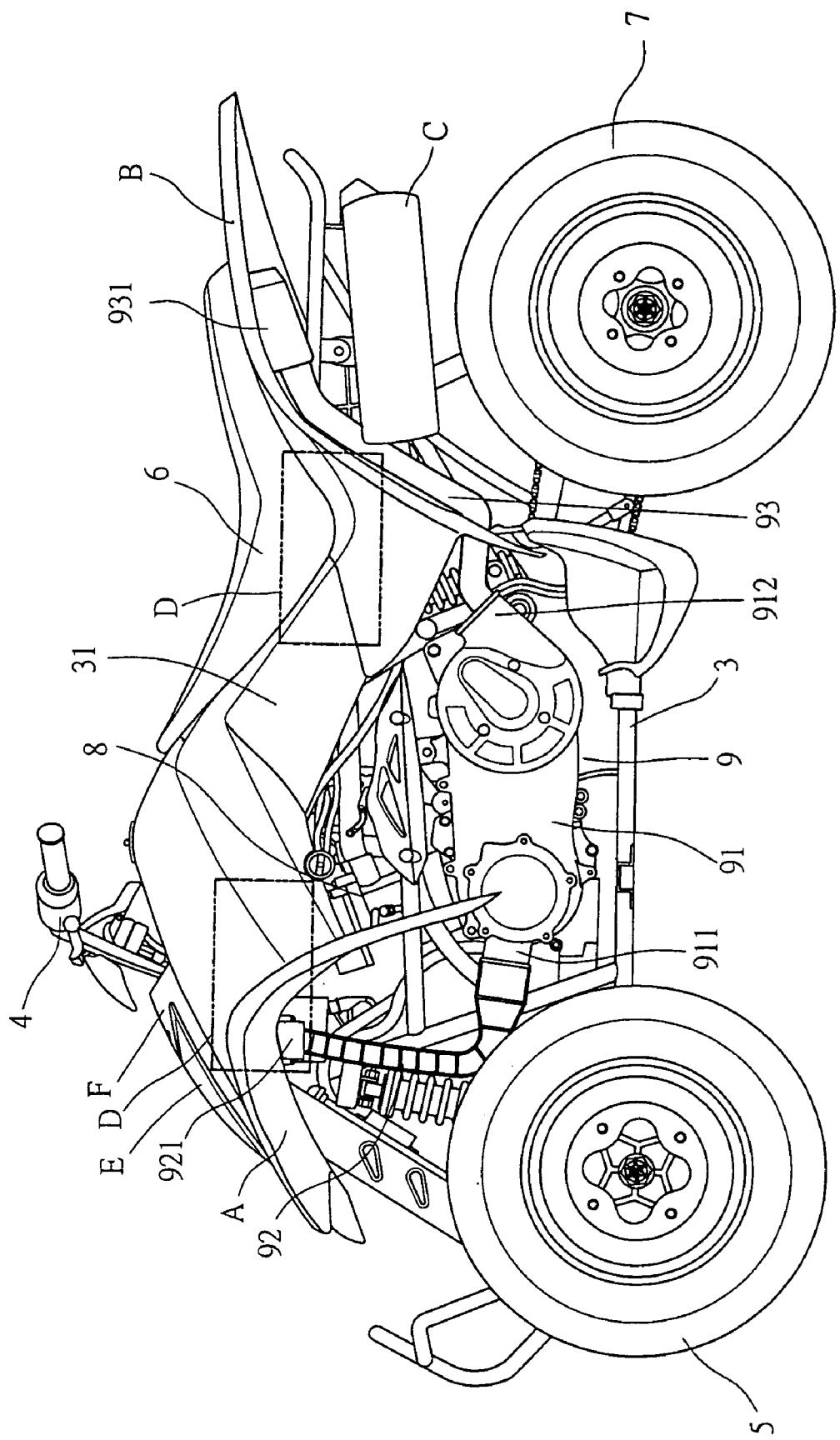
FIG. 7 is a side view of another preferred embodiment of the present invention.

Shown in FIG. 7 is another preferred embodiment of the present invention. A compartment D can be installed in front of the chassis 3 or underneath the riding seat; or a front light E can be installed in the front cover F. The present invention cooling structure for a continuous variation transmission system of an all-terrain vehicle is installed on one side of the chassis 3, revealing itself outside the vehicle body cover 31. Therefore, the present invention can be maintained without disassembling any vehicle component. At the same time, it will enable ease of assembly and maintenance, and reduce the difficulty in installing other components.

To sum up, with the design of the inlet box and exhaust box, the present invention can prevent water, dust and dirt from entering the gearbox effectively. Furthermore, the inlet and exhaust conduit are installed on the outer surface of the chassis, revealing itself outside the body cover. It will result in ease of assembly and maintenance, and also reduce the difficulty of the installation of other components. The present invention has proved to be more effective than prior art and is an advancement on the prior art.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A cooling structure for a continuous variation transmission system of an all-terrain vehicle having a body, comprising:

a gearbox having an air inlet and an air exhaust;

an inlet conduit having a first end connected with said air inlet of said gearbox and a second end connected to an inlet box;

an exhaust conduit having a first end connected with said air exhaust of said gearbox and a second end connected to an exhaust box;

said exhaust box being a box with a port facing a center of said body;
said exhaust box being a box with a port facing a center of said body;
said inlet and exhaust boxes being installed under mudguards of said all-terrain vehicles and sheltered by said mudguards.

2. The cooling structure for a continuous variation transmission system of an all-terrain vehicle having a body as claimed in claim 1, wherein said inlet box and said exhaust box are placed above a tail of an exhaust pipe of said all-terrain vehicle.

* * * * *